United States Patent Office 3,456,790
Patented July 22, 1969

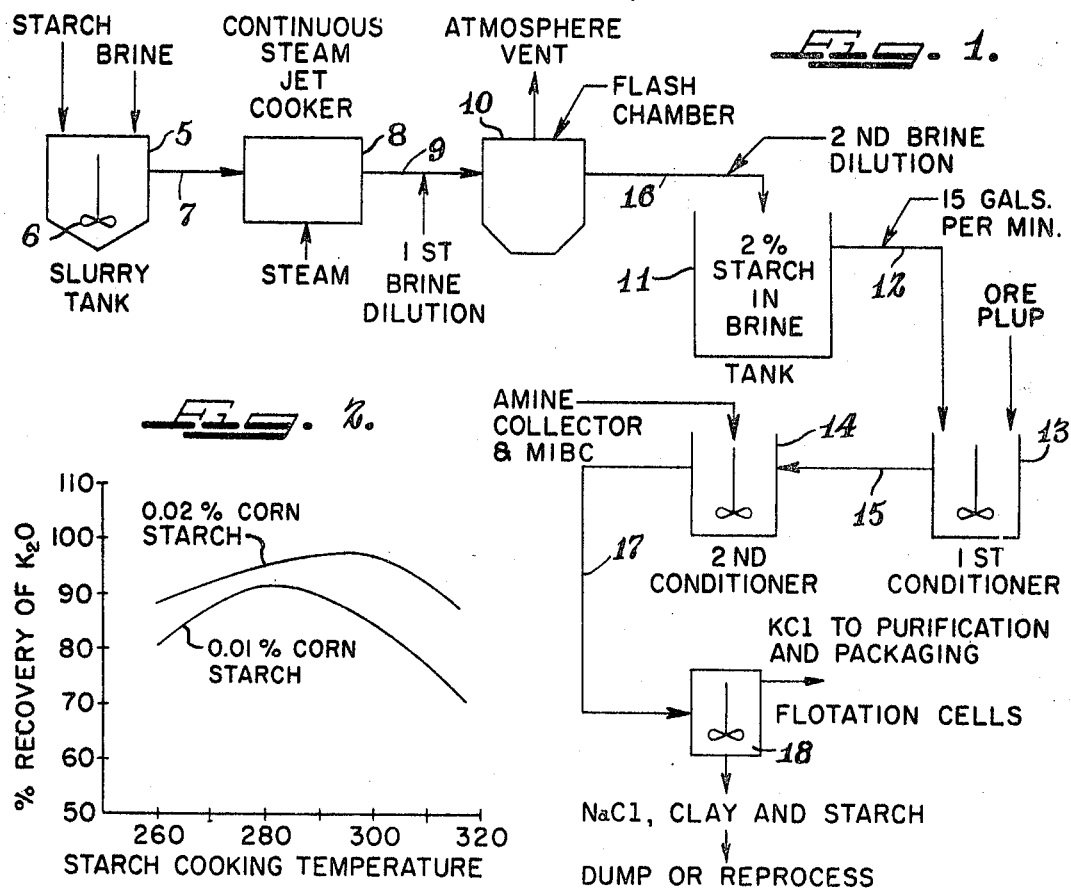
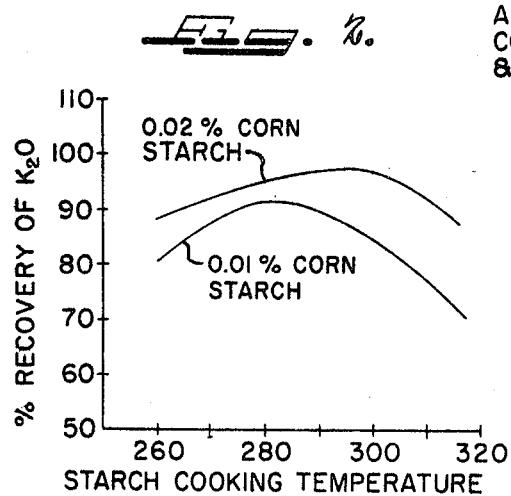
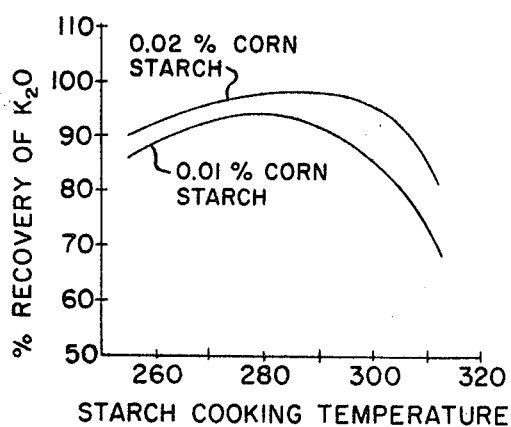
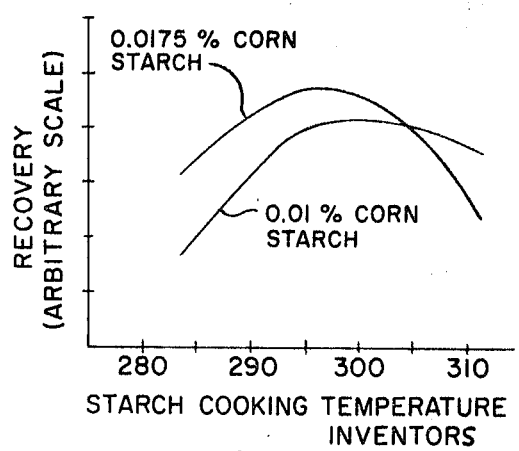

3,456,790
PROCESSING OF SYLVINITE ORES
Byron L. Fast and Raymond R. Reschetz, Decatur, Ill., assignors to A. E. Staley Manufacturing Company, Decatur, Ill., a corporation of Delaware
Filed Nov. 22, 1965, Ser. No. 509,087
Int. Cl. B03d 1/00, 1/14
U.S. Cl. 209—166          6 Claims

ABSTRACT OF THE DISCLOSURE

A method is disclosed for separating sylvite from a pulp containing sylvinite ore by flotation by using an amine mineral collector and an auxiliary reagent. The auxiliary reagent consists of a starch material which has been pasted in a saturated brine solution at a temperature between 265° F. and 315° F.

---

This invention relates to innovations and improvements in recovering sylvite from sylvinite ores. More particularly, it concerns the use of starch, pasted or cooked at elevated temperatures in saturated brine, in a conditioning step wherein the pasted starch serves as a residual slime depressant for deslimed sylvinite ore pulp. This conditioning step is normally followed by a second conditioning step in which the ore pulp is treated with a collector which may be a fatty amine or a fatty anionic surface active agent (soap or sulfate) which preferentially renders the sylvite floatable. If an effective slime depressant were not used, the slime would adsorb and interfere with the action of the collector.

There are large deposits of sylvinite potash ores in the United States, Canada and in other parts of the world. Such ores generally contain from about 5 to 40% sylvite (KCl) with the balance being halite (NaCl) and a small amount of clayey material, such as montmorillonite. Such potash ores are primarily valuable as a source of potash for the fertilizer industry. Typical ores are those of the New Mexico and Utah areas in the United States and the Saskatchewan region in Canada.

In order to separate or recover the sylvite from the other constituents of the ore, a process of crushing, fine grinding and flotation is utilized. The mechanism of grinding and flotation corresponds to other flotation operations except that a saturated brine is employed instead of water as a carrying medium. Brine is used instead of water since both sylvite and halite are soluble in water and any unsaturated water added in the process will dissolve ore and result in a loss.

The collecting agent most commonly employed is a fatty amine of known type which preferentially adheres to the sylvite and not to the halite. However, the amine agent will be consumed by any clay that is present in the ore pulp and the clay will be floated in preference to the sylvite. Accordingly, in carrying out the over-all process, the bulk of the clay is removed by mechanical means to a point of practicability and then it is necessary to add a so-called "slime depressant" which causes any residual clay slimes to have a sufficiently decreased attraction for the amine. Heretofore starch, particularly potato starch, has been used for this purpose, the starch being cooked or pasted in open vessels (i.e. at atmospheric pressure) usually with steam sparging and frequently with the addition of alkali. The starch is said to "blind off" the clay slimes, the effect being to prevent the clay slimes from removing the amine. This kind of operation, using starch and similar carbohydrate polymers in the sylvite process, is referred to in Patents 2,288,497, 2,696,912 and 2,322,789.

A general description of the over-all process referred to above for recovering sylvite from sylvinite ores is set forth on pages 164 and 165 of Mineral Processing Flowsheets, Denver Equipment Co., Denver, Colo. (1962).

In the use of starch for this purpose, potato starch and corn starch have both been tried. Corn starch has lost its place to potato starch, despite the latter's disadvantages in handling, because it has been the general belief in this art that corn starch could not be pasted, i.e. gelatinized, in brine and that corn starch would not produce the high flotation efficiencies. To properly paste the corn starch, alkali (e.g. NaOH) was added to the brine, or the corn starch was first pasted with water. Both these are disadvantageous: the alkali must be neutralized with acid and the water dilutes the saturated brine necessary to obtain flotation without dissolving the ore. Also, sylvite ore frequently occurs at locations where water is scarce. The alternative has been to use potato starch which can be pasted in brine.

Potato starch, however, also has its disadvantages. Its supply is variable and is subject to periods of relative scarcity. More important is the difficulty in handling the raw potato starch when in brine. The raw starch can be used in brine only if the concentration is kept below 4% and the custom has been to use 2%. The reason is that, as soon as potato starch is added to brine at a concentration over about 4%, the suspension begins to thicken even though no heat is applied. This problem grows worse as the concentration is increased, and, as a result, when potato starch is used, it is cooked at concentrations below 4%. This, of course, requires large amounts of heat to raise the saturated brine to a temperature high enough to cook the potato starch. The potato starch can be handled in water alone at higher concentrations, but again this has the undesirable results of requiring a supply of fresh water and of adding a diluent to the brine.

Accordingly, until the present invention, it has been common practice to use potato starch cooked in brine at atmospheric pressure at concentrations of the order of 2%.

It has been discovered in accordance with the present invention that starch (preferably unmodified corn starch which is the most common and inexpensive starch that is commercially available) can be utilized as a slime depressant with more effectiveness than the starch cooked in the manner heretofore used and without the disadvantages referred to, provided that the starch is pasted or cooked in saturated brine in a certain manner. More specifically, it has been discovered that, when the starch is slurried in saturated brine at a substantially high starch solids concentration (e.g. 20%) and then cooked or pasted at an elevated temperature in the critical range of from about 265° F. to about 315° F., it will serve as a very effective and efficient slime depressant in recovering sylvite from sylvinite ores. After the cooking or pasting step, the special corn starch paste is desirably diluted by addition of saturated brine to result in a starch solids content in the order of 2%. Preferably, the cooking or pasting of the corn starch in the saturated brine is carried out in a continuous manner in a steam jet cooker (steam immersion heater) of known type such as the one described in Patent 3,101,284.

Accordingly, it will be seen that a primary object of the invention is the improvement in the process of recovering sylvite from sylvinite ores which consists in the use, as a slime depressant in conditioning deslimed ore pulp, of saturated brine containing starch which has been pasted or cooked in saturated brine at a temperature in the range of from about 265° F. to about 315° F. A further object of the invention is the pasting or cooking of corn starch at a relatively high starch solids concentration in saturated brine at a temperature in the range of about 265° F. to about 315° F. so as to provide a slime depressant of the character described.

Still another object of the invention is the continuous cooking or pasting of a saturated brine slurry of starch at a relatively high starch solids concentration (e.g. 20%) followed by diluting the pasted or cooked brine slurry with additional saturated brine prior to use in conditioning deslimed sylvinite ore pulp, preliminary to treatment of the pulp with a fatty amine collector which preferentially renders the sylvite floatable.

Still another object of the invention is a method or technique of pasting corn starch so that it can be utilized to advantage in place of potato starch in the processing of sylvinite ore for recovery of sylvite therefrom.

Certain other objects of the invention will, in part, be obvious and will in part appear hereinafter.

For a more complete understanding of the nature and scope of the invention, reference may now be had to the following detailed description thereof taken in connection with the accompanying drawings wherein:

FIGURE 1 is a flow diagram illustrating the manner in which the improvement provided by the present invention is utilized in connection with the process of recovering sylvite from sylvinite; and FIGURES 2, 3 and 4 are graphs illustrating the improvement in recovery obtained in using starch cooked in accordance with this invention.

The following example contains a description of a preferred procedure for preparing a saturated brine dispersion or solution of pasted or cooked corn starch for use in the process of recovering sylvite from sylvinite ores as will be described below in connection with the drawing.

Example I

One thousand pounds of pearl, i.e. unmodified, corn starch is slurried in 700 gallons of saturated brine prepared by dissolving ore in water. The resulting slurry, in a uniformly agitated condition, is cooked or pasted in a continuous manner in a high temperature steam jet starch cooker of known type at a temperature of 300° F. One such steam jet starch cooker is described in detail in Patent 3,101,284, above mentioned. Continuous steam jet cookers of various types have been used in the paper and textile industries, for example, for several years. In such a cooker, the starch slurry, flowing axially through the steam jet heater, is mixed rapidly and thoroughly with high pressure steam flowing radially into the starch slurry. The slurry is brought rapidly with high shear to the temperature determined by the controls, usually controlling steam pressure, to cause the starch granules to swell and burst and within a few seconds form the dispersion known as a starch paste. It is usually desirable to maintain the starch at the elevated temperature for a brief period which may be up to one-half hour but is desirably less than about twelve minutes and preferably five minutes or less. The temperature may be maintained with a closed hold tank as described and shown in Patent 3,101,284 or, more simply, by flowing the steam-starch-brine through a long pipe having a pressure relief valve at its end before discharge to atmospheric pressure.

The starch solids concentration of the foregoing slurry containing 1000 pounds of starch in 700 gallons of saturated brine is approximately 20%. This is continuously cooked or pasted at the temperature mentioned at the rate, for example, of 10 gallons per minute. The cooked or pasted starch dispersion in saturated brine is diluted by one or more additions of saturated brine as it passes through a conduit from the discharge of the jet cooker and is delivered into a holding tank at atmospheric pressure. The addition of saturated brine may be made by simply introducing the saturated brine into the pipe line through which the dispersion of pasted or cooked starch is flowing. The first addition of the saturated brine is preferably made before discharge of the starch into a flash chamber having an atmospheric vent. This avoids undue evaporation from the brine and recovers part of the heat content of the paste to bring the dilution brine up to temperature. The second addition preferably downstream of the flash chamber provides the final temperature adjustment, and, in addition, sufficient saturated brine to dilute the cooked or pasted dispersion down to a starch solids content of 2%, or the desired value, as determined by the operation of the starch cooker. Generally, the desired concentrations will be on the order of 2%. Preferably, the starch should not be stored for any substantial period to avoid degradation that may occur as a result of accidental introduction of bacteria, etc.

Several changes may be made in the foregoing example. Instead of using unmodified corn starch, other starch can be used such as potato, tapioca, waxy maize, sorghum, rice or the separated starch fractions amylopectin and amylose. However, unmodified corn starch will ordinarily be used since it presently is the most economical starch for this purpose.

It is desirable to paste the starch at as high a solids content in the slurry as can practically be handled by the pumps and other equipment in order to minimize steam requirements and volumes to be handled. While 20% starch solids concentration in the slurry is satisfactory, higher or lower solids content may be used depending upon the cooking equipment available and the conditions at which the cooking is carried out. The maximum practical concentration of starch solids is considered to be about 35%, and depends on the equipment. In general, the range is from about 5 to 35% with a definite preference for concentrations of 15 to 30%.

The necessary temperature range for cooking or pasting the starch in the saturated brine is between about 265° F. to about 315° F., as illustrated in the following example.

Example II

A brine to serve as flotation medium was prepared by mechanically agitating sylvinite ore from the Carlsbad, N. Mex., area in water and adding small amounts of sodium and potassium chlorides. The brine had a specific gravity of 1.250 (75° F.), contained 33.3% solids and analyzed 6.48% $K_2O$ by weight.

Ore crushed to minus 28 mesh (3000 grams per batch) was soaked five minutes in the brine (11 liters per batch), agitated five minutes and allowed to settle one minute. Partial desliming was accomplished by withdrawing the upper layer and adding back an equivalent volume of fresh brine. The pulp was again agitated for 2 minutes, allowed to settle and another slime fraction was decanted. The deslimed underflow was then divided into twelve equal parts, one part being retained as a head sample, one part being used as a flotation blank (i.e. without starch) and the remaining ten parts being used to test the starch samples.

Each sample used for flotation was prepared by agitating for two minutes with the appropriate quantity of the test starch. Fatty amine (Armac TD, understood to be 30% hexadecylamine acetate, 25% octadecylamine amine acetate and 45% octadecenylamine acetate) was next added at the rate of 0.4 pound per ton. A drop of methyl isobutyl carbinol was added to each sample as a frothing aid and the sample conditioned for one minute. The conditioned pulp was transferred to the flotation machine (250-gram laboratory flotation cell) and brine added to proper pulp level. Froth was removed for approximately 45 seconds (until barren) maintaining the pulp level during flotation.

The sample starches (unmodified corn starch, "pearl") were prepared in the manner described in Example I, varying the temperature in the steam jet and the hold time (time at temperature before discharge to atmospheric pressure). For comparison, samples of starch were also prepared by cooking potato starch at 2% solids in brine and unmodified corn starch at 2% solids in brine, each for 30 minutes on a steam bath (saturated steam at atmospheric pressure). The results of the flotation tests are set forth in FIGURES 2 and 3, the starch having been added at the rates of 0.2 pound per ton (0.01%) and 0.4 pound per ton (0.02%). FIGURE 2 is the data for starch cooked with a 15-second hold time and FIGURE 3 is the corresponding data for a 120-second hold time.

With 0.01% starch, a maximum recovery of about 91% and about 94% was obtained with the 15- and 120-second hold times respectively. With 0.02% starch, the corresponding maxima were both about 97.5%. For comparison, the potato starch cooked at atmospheric pressure in 2% slurry in brine yielded recoveries averaging 68% and 81% at rates of 0.01 and 0.02% respectively, while the corn starch cooked at atmospheric pressure averaged 44% and 60% at the same respective concentrations. The blank (no starch addition) gave recoveries close to those obtained with corn starch cooked at atmospheric pressure, i.e. in the range of 40–65%.

It is evident that the recovery increases to reach a peak when the starch is cooked at temperatures in the range of about 265° F. to about 315° F. If the corn starch is cooked or pasted at temperatures substantially outside of the range of 265–315° F. the pasted or cooked product will not serve as satisfactorily as a slime depressant. The cooking or pasting should be carried out to an extent based on time and temperature which is sufficient to thoroughly dissolve the starch, but the time should not exceed about 30 minutes. The time and temperature are interdependent since starch is heat sensitive at these temperatures. The maximum time is selected to avoid substantial degradation of the starch, considering the temperature used.

Example III

The results obtained in Example II were also obtained using a similar procedure but with an ore from the Saskatchewan deposits. With an arbitrary scale of recovery as the ordinate, FIGURE 4 shows the results obtained at rates of 0.01% and 0.0175% respectively. The starch cooked in the range of 285° F. to about 315° F. with a 15-second hold time was far superior.

Instead of employing a continuous type steam jet cooker the slurry of starch in saturated brine may be pasted or cooked in a batch operation in an autoclave or other closed vessel designed to withstand superatmospheric pressures commensurate with brine temperatures in the range mentioned.

Referring now to the FIGURE 1, a slurry make-up tank is indicated at 5 which is equipped with an agitator 6. Saturated brine and dry pearl starch are separately introduced into the open tank 5 in the desired proportions. The slurry in uniformly agitated condition, is withdrawn from the tank 5 through a line 7 and introduced into a steam jet starch cooker which is indicated diagrammatically at 8. From the cooker 8 the pasted or cooked dispersion or solution of the starch in saturated brine is flowed through pipe 9 to a flash chamber 10 vented to atmospheric pressure and thence into a tank 11. Brine for dilution purposes is introduced into pipe 9 upstream of the flash chamber and again into pipe 16 between the flash chamber and the tank 11, for the purposes described before.

From the tank 11 the pasted starch at a solids concentration of approximately 2% is introduced through pipe 12 at the desired rate (e.g. 15 gallons per minute) into a first ore pulp conditioner 13 of known type (e.g. a Denver open type heavy duty conditioner). Deslimed ore pulp that has been subjected to known type crushing, grinding, classification, scrubbing and desliming operations in known type equipment is introduced into the conditioner 13 as indicated.

The pasted or cooked corn starch serves as a slime depressant in the first conditioner 13 and prevents the fatty amine from being preferentially attracted to the slime or clay when the amine and flotation aid (here methyl isobutyl carbitol, designated MIBC in the drawing) is added in a second conditioner 14 to which the pulp is conveyed through conduit 15 from the conditioner.

Various fatty amines may be utilized as collectors together with auxiliary flotation agents of known type, in concentrations and manner well known in the art. In this respect, the present invention does not require any change in the sylvite recovery process as conventionally practiced insofar as the type, amount and manner of addition of the amine collector is concerned. Various fatty amines that may be satisfactorily used are the saturated and unsaturated alkyl primary amines having at least 7 carbon atoms in the alkyl group. These are described in U.S. Patent 2,696,912 and include n-decylamine, n-undecylamine, lauryl amine, n-octyl amine, stearyl amine, oleyl amine, linoleyl amine, linolenyl amine, and the like, including mixtures thereof, such as those obtained from the amination of hydrogenated tallow. It is believed that any of the primary aliphatic amines having a straight chain of 8 to 22 carbon atoms will be suitable.

The amines may be used as the free amine or as their salts with simple acids, such as the halides (chloride, particularly) or the lower monobasic organic acids, e.g. acetic, propionic, butyric, etc. The amine collectors may also contain, as is common, varying proportions of aliphatic secondary and tertiary amines. In addition to the amine, it is usually desirable to add a foaming or frothing agent of known type such as the methyl isobutyl carbitol referred to above, pine oil, etc.

It is believed tht anionic collectors of the types heretofore employed can also be used in this invention. These include fatty acid soaps, for example, from oleic, pelargonic, linoleic, lauric, acids; fatty acid sulfates, such as sodium lauryl sulfate and sulfated fatty esters such as the Emery Industries product Twitchell 7250.

From the second conditioner 14, the fully conditioned ore pulp is delivered by way of conduit 17 into the flotation cells 18, e.g. a six-bank flotation cell installation. Such an installation will be operated in known manner with air being introduced into the pulp mixture with agitation. Flotation of the sylvite takes place principally in the first four cells with over 80% occurring in the first cell. The "blinded" clay and halite are removed through the lower portions of the cells and either sent to a dump or a brine clarification system. The floated sylvite or potash is refloated with the use of additional amine and frothing or foaming agent. The brine is then separated from the resulting KCl concentrate and the KCl processed for packaging, e.g. for fertilizer use.

Tests have been conducted under controlled conditions in which pasted or cooked potato starch, as conventionally prepared, was compared in efficiency as a slime depressant with corn starch pasted or cooked at elevated temperatures in saturated brine in accordance with the present invention. As a result of these tests, it was established that the starch, when processed in accordance with the present invention, is more efficient than starch processed as heretofore in that greater recoveries of sylvite were obtained. To this increased efficiency there are the further advantages in regard to corn starch in that it is capable of being pasted or cooked in saturated brine at high solids concentrations and is more readily available at lower cost.

Since many embodiments of this invention can be made and since many changes may be made in the embodiments described, the foregoing is to be interpreted as illustrative only and the invention is defined by the claims appended hereafter.

We claim:

1. In a process of recovering valuable constituents from sylvinite ore by froth flotation using a mineral collector and an auxiliary reagent on a pulp containing the ore, the improvement which comprises distributing in said pulp a useful concentration of an auxiliary reagent comprising starch which has been pasted or cooked in substantially saturated brine at a temperature in the range of from about 265° F. to about 315° F.

2. The process of claim 1 in which the collector is an amine collector.

3. The improvement of claim 2 in which the starch is corn starch.

4. The improvement called for in claim 3 wherein the corn starch is pasted or cooked by mixing a brine slurry continuously with steam in a jet cooker.

5. The improvement called for in claim 1 wherein the time for which the starch is held in said temperature range does not exceed approximately 30 minutes.

6. The improvement called for in claim 1 wherein said starch is corn starch and is pasted or cooked at a starch solids content of approximately 5 to 35%, and the resulting paste is immediately diluted with brine.

References Cited

UNITED STATES PATENTS

| | | | |
|---|---|---|---|
| 2,689,649 | 9/1954 | Atwod | 209—166 |
| 2,695,100 | 11/1954 | Barr | 209—166 |
| 3,078,187 | 2/1963 | Bravos | 127—71 X |
| 3,105,778 | 10/1963 | Anderson | 127—69 |

FOREIGN PATENTS

| | | |
|---|---|---|
| 308,616 | 9/1915 | Germany. |
| 564,338 | 9/1944 | Great Britain. |

HARRY B. THORNTON, Primary Examiner

R. HALPER, Assistant Examiner